US012410937B2

(12) United States Patent
Dong et al.

(10) Patent No.: US 12,410,937 B2
(45) Date of Patent: Sep. 9, 2025

(54) CONTROL SYSTEM FOR MEDIUM-SIZED COMMERCIAL BUILDINGS

(71) Applicants: Bing Dong, Manlius, NY (US); Jianshun Zhang, Jamesville, NY (US)

(72) Inventors: Bing Dong, Manlius, NY (US); Jianshun Zhang, Jamesville, NY (US)

(73) Assignee: SYRACUSE UNIVERSITY, Syracuse, NY (US)

( * ) Notice: Subject to any disclaimer, the term of this patent is extended or adjusted under 35 U.S.C. 154(b) by 302 days.

(21) Appl. No.: 17/706,891

(22) Filed: Mar. 29, 2022

(65) Prior Publication Data

US 2022/0325913 A1    Oct. 13, 2022

Related U.S. Application Data

(60) Provisional application No. 63/167,193, filed on Mar. 29, 2021.

(51) Int. Cl.
| | | |
|---|---|---|
| *F24F 11/65* | (2018.01) | |
| *F24F 11/00* | (2018.01) | |
| *F24F 11/46* | (2018.01) | |
| *G05B 19/042* | (2006.01) | |
| *F24F 110/10* | (2018.01) | |

(Continued)

(52) U.S. Cl.
CPC .......... *F24F 11/65* (2018.01); *F24F 11/0001* (2013.01); *F24F 11/46* (2018.01); *G05B 19/042* (2013.01); *F24F 2011/0002* (2013.01); *F24F 2110/10* (2018.01); *F24F 2110/50* (2018.01);

(Continued)

(58) Field of Classification Search
CPC ........ F24F 11/65; F24F 11/0001; F24F 11/46; F24F 2011/0002; F24F 2110/10; F24F 2110/50; F24F 2120/10; F24F 2130/10; F24F 11/30; F24F 11/52; F24F 11/56;
(Continued)

(56) References Cited

U.S. PATENT DOCUMENTS

| | | | |
|---|---|---|---|
| 2008/0014857 A1* | 1/2008 | Spadafora | F24F 11/46 |
| | | | 454/229 |
| 2008/0182506 A1* | 7/2008 | Jackson | F24F 11/64 |
| | | | 454/354 |

(Continued)

*Primary Examiner* — Christopher E. Everett
(74) *Attorney, Agent, or Firm* — David L. Nocilly; Bond Schoeneck & King PLLC (57) ABSTRACT

An HVAC control system having a cloud-based optimization engine in communication with a local building hub that interfaces with the building HVAC system and room units. The cloud-based optimization engine implements an optimal and predictive control strategy to integrate occupancy prediction, weather forecasting, and modeling of indoor infection risk, indoor air quality, and building energy consumptions. The control strategy includes a model-based predictive control and a model-free reinforcement learning approach. The control strategy considers outdoor weather (both thermal and air quality) conditions, indoor occupancy and requirements for IAQ and infectious risk reduction to decide whether outdoor air should be introduced and how much fresh air will be introduced into the space. Communications with the building hub allow the local HVAC unit to be driven according to the optimization plan. Individual room sensing units can provide local sensor data to the cloud-based optimization engine.

12 Claims, 6 Drawing Sheets

(51) Int. Cl.
*F24F 110/50* (2018.01)
*F24F 120/10* (2018.01)
*F24F 130/10* (2018.01)

(52) U.S. Cl.
CPC ....... *F24F 2120/10* (2018.01); *F24F 2130/10* (2018.01); *G05B 2219/2614* (2013.01)

(58) Field of Classification Search
CPC .......... G05B 19/042; G05B 2219/2614; Y02B 30/70
See application file for complete search history.

(56) References Cited

U.S. PATENT DOCUMENTS

| | | | | |
|---|---|---|---|---|
| 2016/0091904 | A1* | 3/2016 | Horesh | F24F 11/58 |
| | | | | 700/276 |
| 2016/0116181 | A1* | 4/2016 | Aultman | F24F 11/70 |
| | | | | 700/276 |
| 2018/0299159 | A1* | 10/2018 | Ajax | F24F 11/46 |
| 2020/0348038 | A1* | 11/2020 | Risbeck | F24F 11/70 |
| 2021/0080915 | A1* | 3/2021 | Yan | F24F 11/46 |
| 2021/0158975 | A1* | 5/2021 | Turney | G16Y 40/20 |

* cited by examiner

CONTROL SYSTEM FOR MEDIUM-SIZED COMMERCIAL BUILDINGS

CROSS-REFERENCE TO RELATED APPLICATIONS

The present application claims priority to U.S. Provisional Application No. 63/167,193, filed on Mar. 29, 2021, hereby incorporated by reference in its entirety.

BACKGROUND OF THE INVENTION

1. Field of the Invention

The present invention relates to heating and air conditioning control systems and, more specifically, to controlling the HVAC system of a medium sized commercial building to minimize infection risk, improve air quality, and maximize energy savings.

2. Description of the Related Art

Before the COVID-19 pandemic, buildings accounted for more than 40 percent of the total energy demand in the U.S. According to the U.S. Department of Energy (DOE), the resulting annual national energy bill totaled more than $430 billion. The need for minimizing the risk of infection during the pandemic and for further improving indoor air quality (IAQ) in the post-pandemic era presents a unique opportunity for innovation in methodology and technology that meet the needs in both the environmental health and building energy efficiency. Accordingly, there is a need for an approach that can minimize infection risk and improve air quality, while maximizing energy savings.

BRIEF SUMMARY OF THE INVENTION

The present invention is an approach that addresses the health-energy nexus in medium-sized commercial buildings with roof-top units. This system includes a cloud-based platform that implements an optimal and predictive control strategy to integrate occupancy prediction, weather forecasting, and modeling of indoor infection risk, indoor air quality, and building energy consumptions. The control strategy is designed based on model-based predictive control and model-free reinforcement learning. The system is designed to compute and implement the optimal rooftop unit control actions by forecasting future states of occupancy, local weather, ambient air quality, room temperature and indoor air quality, forecasting future room heating and cooling loads, and communicating with the building automation system or the rooftop operation system and any separately deployed sensors to obtain current and historical room temperature, indoor air quality, and current operation mode of tunable air filtration/purification/disinfection. The system includes activating the model predictive control algorithm for optimal system operation by balancing indoor air quality and energy usage to determine when outdoor weather (both thermal and air quality) conditions indicate whether the outdoor air should be introduced, to decide how much fresh air will be introduced into space, to calculate the total energy consumed by a rooftop unit, and to decide whether to introduce more fresh air or turn on a local air cleaner.

In one embodiment, the present invention is a system for controlling a heating, ventilation, and air conditioning (HVAC) system having at least one sensor unit configured to determine a current room temperature, a current occupancy, and a current indoor air quality of a room in which the sensor unit is positioned. A control hub is interconnected to the sensor hub to receive the current ambient temperature, the current occupancy, and the current air quality of the room in which the at least one sensor unit is positioned, wherein the control hub includes a local communication interface for operation of an HVAC unit having an operational state and a selectable amount of fresh air by selecting the operational state and by selecting the selectable amount of fresh air intake, and a remote communication interface that allows the control hub to receive the at least one command indicating how the control hub should control operation of the HVAC unit. A remote host is configured to communicate with the control hub, wherein the remote host is programmed to issue the at least one command to the control hub to implement a control strategy developed by an optimization engine that determines how to operate the HVAC unit based on a forecasting of future occupancy, a forecasting of future weather, a future ambient air quality, a future room temperature, a future indoor air quality, a future energy load, as well as the current room temperature, the current occupancy, and the current indoor air quality to minimize a total energy consumption of the HVAC unit while minimizing an overall infection risk.

In another embodiment, the present invention is a method of controlling a heating, ventilation, and air conditioning (HVAC) system. The method includes the step providing at least one sensor unit configured to determine a current room temperature, a current occupancy, and a current indoor air quality of a room in which said sensor unit is positioned. The method further includes the step of connecting a control hub to said sensor hub to receive said current ambient temperature, said current occupancy, and said current air quality of the room in which said at least one sensor unit is positioned. The method further includes the step of connecting said control hub to an HVAC unit having an operational state and a selectable amount of fresh air. The method additionally includes the step of connecting said control hub to a remote host programmed at least one command to said control hub according to a control strategy developed by an optimization engine that determines how to operate the HVAC unit based on a forecasting of future occupancy, a forecasting of future weather, a future ambient air quality, a future room temperature, a future indoor air quality, a future energy load, as well as said current room temperature, said current occupancy, and said current indoor air quality to minimize a total energy consumption of the HVAC unit while minimizing an overall infection risk. The method also includes the step of using said control hub to operate the HVAC unit according to said at least one command by selecting said operational state and by selecting said selectable amount of fresh air intake.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
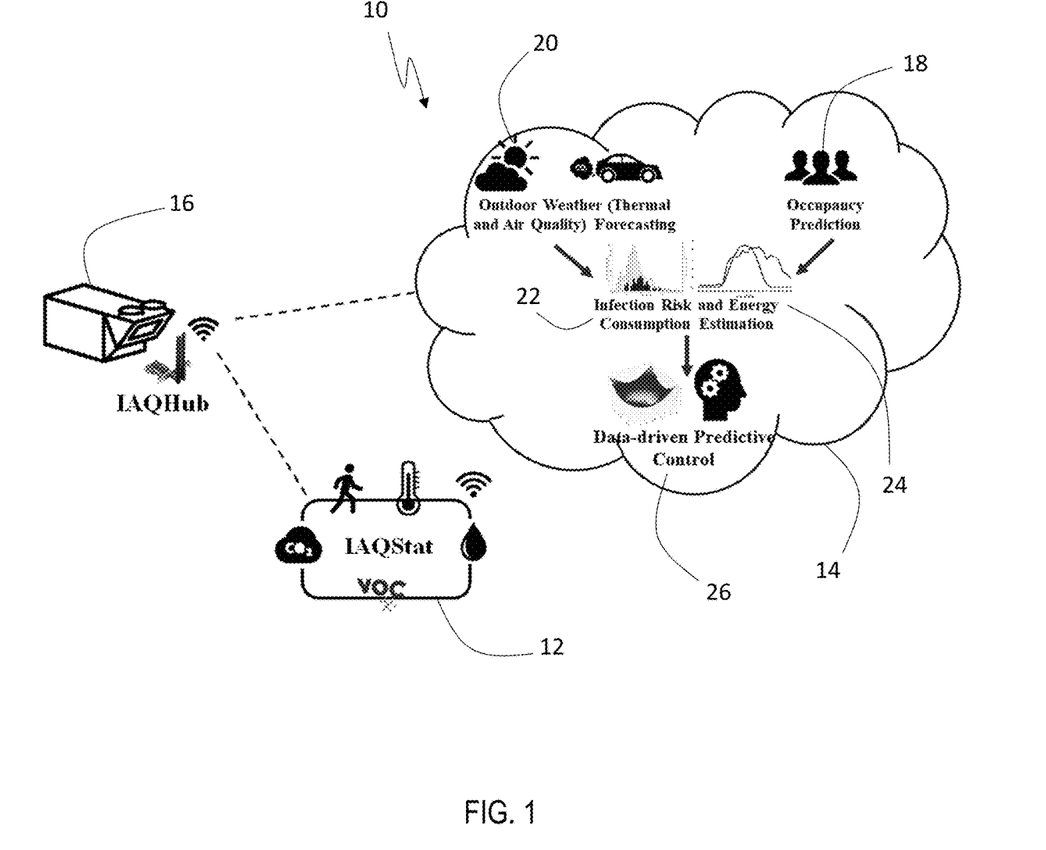
FIG. 1 is a diagram of a cloud-based system according to the present invention for optimizing the HVAC system of a building to minimize infection risk, improve air quality, and maximize energy saving.

Referring to the drawings, wherein like parts refer to like parts throughout, there is seen in FIG. 1 a system 10 that can address the health-energy nexus in medium sized commercial buildings, i.e., those structures that include a roof-top HVAC unit and associated controller having two stages. System 10 implements an optimal and predictive control strategy to integrate data from local sensors 12 such as indoor air quality, with occupancy prediction 18, weather forecasting 20, and modeling of indoor infection risk 22 and building energy consumption 24. The control strategy is designed based on two approaches, namely, a model-based predictive control and a model-free reinforcement learning approach. The control strategy considers outdoor weather (both thermal and air quality) conditions to decide whether outdoor air should be introduced and how much fresh air will be introduced into the space. The amount of fresh air is part of total airflow into the space, $\dot{m}_{room}$. The control strategy also calculates the total energy consumed by a roof top unit, where the total amount of fresh air plays a key role and decide whether introduce more fresh air or turn on an air cleaner, which consumes additional energy.

System 10 is designed to be implemented via a cloud service-based platform 14 that communicates with a building hub 16 that is coupled to and in communication with the controller of the HVAC rooftop unit. Cloud platform 14 of system 10 determines the optimal rooftop unit control actions and provides the control actions to hub 16. Cloud platform 14 determines the optimal rooftop unit control actions by forecasting future states of occupancy 18, local weather forecasting 20, ambient air quality 22, room temperature and indoor air quality 24, forecasting to predict such things as future room heating and cooling loads, and communicating with a building automation system or a rooftop operation system having separately deployed sensors to obtain current and historical room temperature, indoor air quality, and current operation mode of tunable air filtration/purification/disinfection. Cloud platform 14 preferably uses a model predictive control algorithm for optimal system operation and data-driven predictive control 26, as further described herein.

System 10 is programmed to optimize the functions of roof top units, such as the total amount of outdoor air intake amount and its schedule, the operation of heating/cooling stages, the supply air flow rate into the space and its schedule, the room/space temperature setpoint and its schedule, the operation mode of tunable air filtration/purification/disinfection and its schedule (if any), and the operation mode of an in-room air cleaner on/off and its schedule (if any).

The architecture of system 10 is configured to be scalable for applications at individual room level by employing room specific IAQStats 12 (referred to as "WellBuildingStat") that collectively interface with hub 16 in charge of the HVAC controller or building automation system for whole building performance optimization. Hub 16, referred to herein as "IAQHub," communicates with cloud platform 14 to receive the predictive control outputs from cloud platform 14 and to send appropriate control signals to the HVAC controller of rooftop HAV unit. System 10 can also take grid signal through OpenADR and participate in any demand response program.

The overall predictive control of system 10 includes both software and hardware components. The software components include component modeling and cloud service. The modeling components include: 1) occupancy prediction model, 2) local weather (temperature and solar radiation forecasting) model, 3) local ambient air quality forecasting, 4) room/space heating and cooling load forecasting model, 5) indoor infection risk and indoor air quality (IAQ) model, and 6) HVAC model.

The hardware components of system 10 include: 1) an IAQHub 16 for each RTU with modBus to WiFi/other communication adaptor, if needed, 2) an IAQStat 12 with temperature, relative humidity, particle sensors, TVOC, $CO_2$ sensors; 3) tunable air filtration/purification/disinfection technologies in rooftop units if available, 4) an IOT compatible in-room air cleaner if available; and 5) ambient air quality sensor(s). System 10 may also include an input or flag to configure system 10 to consider the type of mask worn by occupants (if any).

The integrated control, energy and IAQ management, and optimization of system 10 is programmed to make decisions about how to have hub 16 operate the controller of the HVAC rooftop unit based on: (i) IAQ and infection risk (IAQ&i-Risk) model that predict the infection risk and the concentration of the indoor air contaminants of interest based on outdoor air intake flow rate and air quality, total supply airflow rate, operation mode and efficiency of the tunable air filtration/purification/disinfection technologies, in room air cleaner and type of mask; (ii) room/space load forecasting; (iii) occupants' thermal comfort preferences; (iv) occupants' schedule forecasting; (v) room/space control state estimation; (vi) room/space air quality states; (vii) room/space operational constraints; (viii) weather forecasting; and (ix) grid signals (e.g. demand response).

The integration of the coupled IAQ&i-Risk model and energy model into an occupancy and weather-based predictive controller that also considers grid signals requires decision-making capabilities over a time horizon. Due to the uncertainty in occupancy, load and weather forecasting, the control solution determined by system 10 is non-trivial. System 10 includes that use of two approaches to achieve the above described control decisions.

First, system 10 is programmed to implement a model predictive control approach In this approach, system 10 uses a real-time optimization framework in this project to integrate decision-making, forecasting, state estimation, and prediction by considering moving horizon optimization formulations that also deal with uncertainty in load and weather by using stochastic programming methods. System 10 includes an optimization engine that computes schedules of outdoor air intake airflow rate, cooling/heating stages, supply airflow rate, room set points for temperature, relative humidity and target pollutant concentrations, operation mode of the tunable air filtration and operation mode of the in-room air cleaner based on the information it collects. The objective function is to minimize the total energy consumption from the associated HVAC system and the overall infection risk. The main features of the optimization engine include: (1) a multi-objective model predictive control architecture, (2) data driven models for unknown states and parameters; (3) mixed integer programming formulation to solve both continuous and discrete equipment controls such as in-room air cleaners, and (4) stochastic programming for uncertainty management.

The multi-objective model predictive control architecture considers both health and energy so that the optimization engine employs a hybrid (mixture of physics and data-driven) model predictive control framework. Due to the periodic daily pattern of room/space/building heating and cooling load, occupant presence, and utility prices, the optimization engine of system 10 needs to be able to plan 12 or 24 hours ahead, so that it can provide optimal controls for HVAC, air cleaner and outdoor air intake strategies according to the occupancy, load and price patterns. The optimization has two objectives: (a) minimize the total energy usage/cost; (b) minimize the infection and health risk of certain pollutant of interest.

The data driven models for unknown states and parameters is premised on the knowledge that some physical parameters (for example: thermal resistance and capacitance values of the simplified building thermal model) of model predictive control are unknown. A Kalman filter is used to estimate those unknown parameters. In addition, previous research efforts in machine learning based occupancy and load forecasting may be used.

A mixed-integer programming formulation (involving both continuous and discrete control actions) is applied to the overall objective functions and all equipment dynamics in a building. The objective function is to minimize the total cost, which includes energy cost and demand charge, and infection risk at both space and building level.

Stochastic programming is used as both load and weather forecasting cannot predict with 100 percent accuracy. System 10 may thus use the stochastic programming methodology, referred to as sample average approximation approach, to explicitly consider the forecast uncertainty and decide HVAC controls that balance against various forecast profiles. Instead of optimizing over one set of future load and solar profiles, this algorithm optimizes over multiple sets of future load and solar profiles, and attempts to compute HVAC controls that are feasible for all given profiles and minimizes over the average objective values of the profiles.

Second, system 10 uses model free reinforcement learning.

Figure 2:
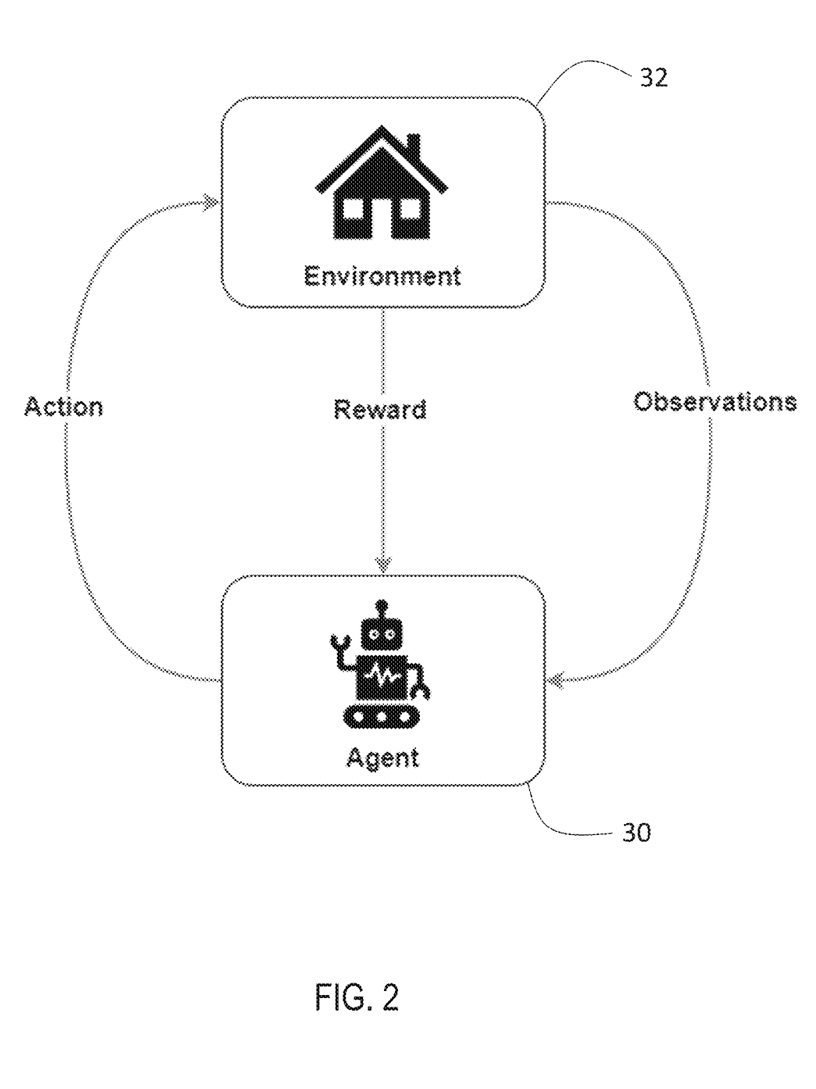
FIG. 2 is a diagram of a reinforcement learning approach that may be implemented by a system according to the present invention.

Referring to FIG. 2, in reinforcement learning (RL), at each time step t, the agent 30 chooses an action $A_t$=a following a policy $\pi_\theta$ and sends it to the environment 32. After receiving the action, environment 32 will update its state space and send a new observation $O_{t+1}$ along with the reward $R_t$=r of the action back to agent 30. Agent 30 will update its policy by evaluating new observations and the reward of the previous action, then send new action to environment 32 at the next time step. The goal of the agent is maximizing total rewards $R_t$ by learning optimal action policy $\pi_\theta$.

In system 10, agent 30 chooses control action a and send it to the environment, so a building model (physics-based or data-driven) in the environment is needed to interact with the agent. Based on the action a received, this building model will update its state space $S_t$ and provides new space observation $O_{t+1}$, and reward $R_t$ to agent 30. The target actions are schedules of outdoor air intake airflow rate, cooling/heating stages, supply airflow rate, room set points for temperature, relative humidity and target pollutant concentrations, operation mode of the tunable air filtration and operation mode of the in-room air cleaner based on the information it collects.

Figure 3:
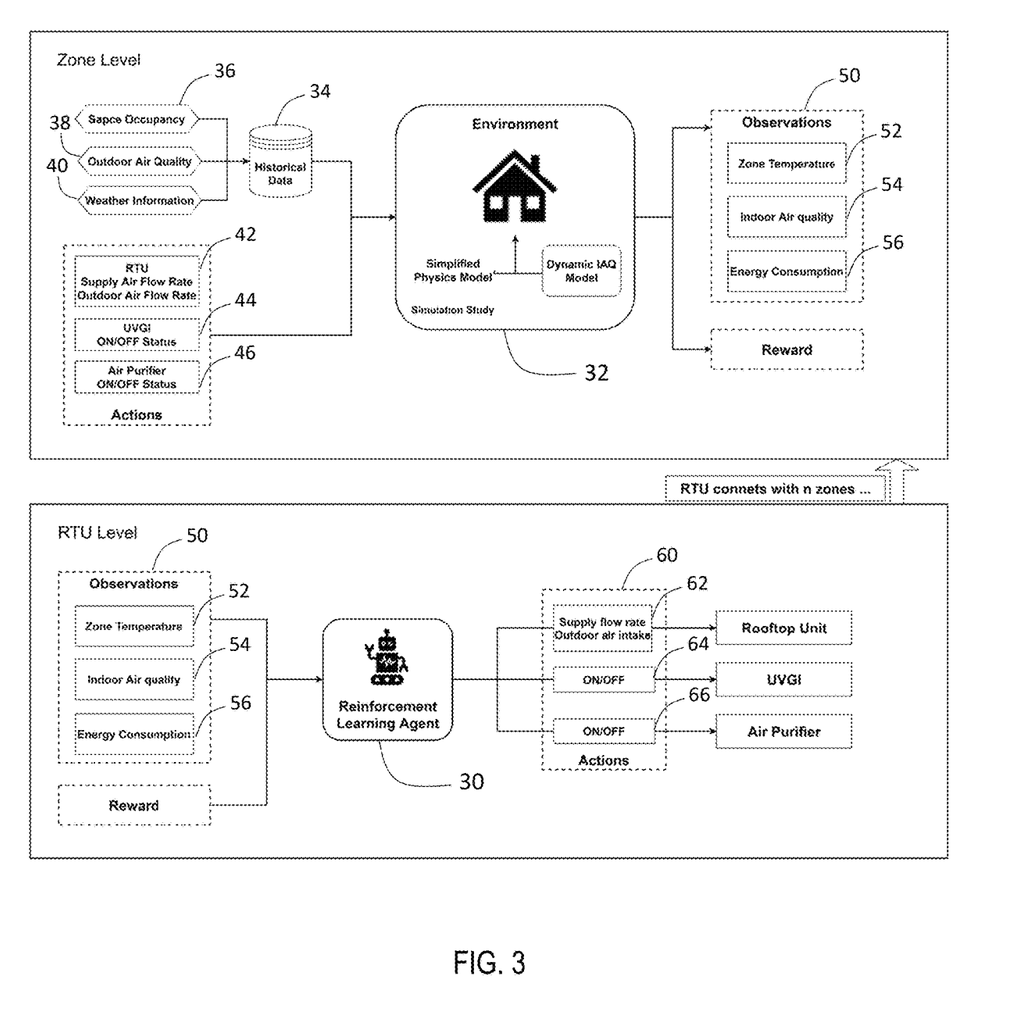
FIG. 3 is a diagram of simulation approach with model-based reinforcement learning in a system according to the present invention.
Figure 4:
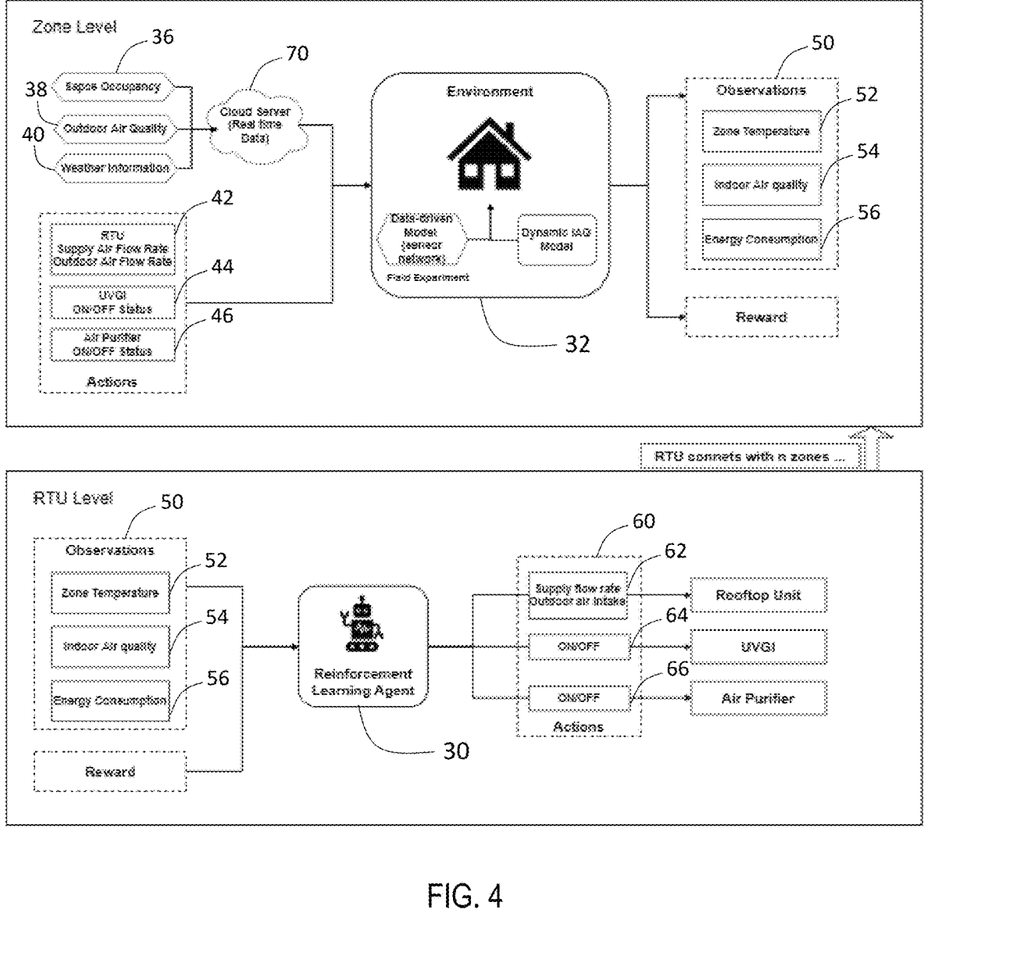
FIG. 4 is a diagram of data-driven approach with model-free reinforcement learning in a system according to the present invention.

To obtain the environment, there are two approaches. System 10 may use an existing physics-based model where historical measured data is used to train the RL agent. The environment includes an existing simplified physics model and the dynamic IAQ model, as seen in FIG. 3. System 10 may also use a model-free approach where the sensor network within the building and HVAC system provides real-time measured data to the RL agent. In this approach, the environment includes a data-driven model and the dynamic IAQ model. In FIG. 3, historical database 34 has stored data, including space occupancy 36, outdoor air quality 38, and weather information 40, for use by environment 32. Air flow rates 42, UVGI status 44, and air purifier status 46 are also considered by environment 32. Environment 32 also has access to observations 50 such as zone temperature 52, indoor air quality 54, and energy consumption 56. At the RTU level, RL agent 30 can process observations 50 such as zone temperature 52, indoor air quality 54, and energy consumption 56 to decide on actions 60, such as changes to air flow rates 62, turning UVGI ON/OFF 64, and turning purifiers ON/OFF 66. FIG. 4 shows the overall RL control in a field experiment study, with the primary difference being the use of a cloud server 70 with real-time data, rather than database 34.

The IAQ&i-Risk model predicts the concentrations of pollutants of interest (such as virus, PM2.5, PM10, $O_3$, VOCs and $CO_2$) in the occupied zone and estimate the health risks associated with the occupant exposure to the various pollutants. The concentration of an individual pollutant of interest is governed by the following zone mass balance equation:

$$V\frac{dC}{dt} = A_e E(t) - \dot{V}(C - C_s) - A_s S(t) \quad V\frac{dC}{dt} = A_e E(t) - Q(C - C_s) - A_s S(t) \tag{1}$$

Where V=zone volume (m³); C=concentration (μg/m³); $A_e$=emission surface area (m²); E(t) emission factor (i.e., emission rate per unit surface area, μg/h/m²); $\dot{V}$=supply air volumetric flow rate to the zone (m³/h) which is equal to the mass flow rate divided by the air density $$\frac{\dot{m}_{room}}{\rho};$$

$C_s$=concentration of the supply air which includes the effects of ventilation and air cleaning in the central HVAC system (μg/m³); $A_s$=Area of sink surfaces (m²); S(t)=sorption/filtration/cleaning rate by sinks including in-room air cleaners and deposition or adsorption by indoor surfaces (μg/h/m²).

For an indoor pollutant typically found indoor such as PM2.5, $O_3$, and formaldehyde for which the established exposure threshold values are available (called exposure limit values or ELVs), the predicted concentrations are divided by the threshold values of the pollutants of interest (i) to obtain the dimensionless concentration or concentration ratio ($C_i/C_{iELV}$). Pollutants with concentration ratios larger than one are the target pollutants that requires control actions (ventilation or targeted air cleaning) to reduce them to less than 1 for satisfactory IAQ.

The same equation (1) is applied to determine the virus concentration (C) in the space and the resulting dose exposure to the virus under as follows:

Set $A_e$ E(t) to IqRs—i.e., the number of initial infected people (I) times the quantum generation rate per person (q) and times the fraction of virus leaving the mask ($R_s$), representing the virus generation rate in the space;

Set $C_s$ to $(1-\dot{V}_o/\dot{V})(1-\eta_{filter})C$, which accounts for the effect of air filters in the central HVAC system as well as that of the outdoor to total airflow ratio, where $\eta_{filter}$ is the single pass efficiency or the filter installed in the HVAC recirculation duct;

Set $A_sS(t)$ to $(k_{UV}+k_{purifier}+k_{deposition})VC$, accounting for the "equivalent clean air change rate" of UVGI ($k_{UV}$) and purifier ($k_{purifier}$) and the deposition of virus-containing particles inside the space ($k_{deposition}$).

Thus, for an infectious virus, Eqn. (1) can be revised as:

$$V\dot{C} = Iq + \dot{V}\left[\left(1 - \frac{\dot{V}_0}{\dot{V}}\right)(1 - \eta_{filter})C - C\right] - (k_{UV} + k_{purifier} + k_{deposition})VC \quad (2)$$

The viral exposure of an individual during an exposure time period between $t_1$ and $t_2$ is then calculated by:

$$\sqrt{D} = \int_{t_1}^{t_2}(R_1 Cpt)dt \quad (3)$$

where p is the pulmonary flow rate (inhalation rate), $R_1$ is fraction of virus passing through the masks of susceptible in the space.

Equation (4) is then used to determine the probability of infection based on the dose exposure.

$$P = 1 - e^{-D} \quad (4)$$

which is based on the well-known Wells-Riley equation [24]:

$$P = \frac{N_C}{N_S} = 1 - e^{-\frac{Iqpt}{VA}} \quad (5)$$

where $N_C$=the number of new cases in the space; $N_S$=the number of susceptible people; I=the number of virus carrier at the start of the exposure period; q=the infectious quantum generation rate per virus carrier (quanta/h per person); p=pulmonary ventilation rate (m³/h); t=exposure time (h); V=space air volume (m³); $\wedge$=the fresh air change rate in the room (1/h).

Equation (5) establishes the relationship between the probability of infection (i.e., infection risk) in a perfectly mixed air space and the average viral dose exposure (i.e., Equation 4).

The model can be further extended to multizone buildings to account for the inter-zone pollutant transport. The model is used to predict the concentrations over a time of horizon in the MPC model, and the predicted concentrations are compared to pre-established threshold limits for each pollutant of interest such as formaldehyde, PM2.5, $CO_2$, etc. for maintaining satisfactory IAQ in the buildings, and for minimizing the risk of infection through ventilation and air cleaning, which may incur additional energy consumption by building systems.

To meet the purpose of control dynamic model, the equation needs further modification. In the system, the variables that can be controlled, i.e., $\dot{V}$, $\dot{V}_o$, $k_{UV}$ and $k_{purifier}$, should be system inputs. For COVID-19, since $k_{deposition}$ is not determined, cleaning effect of natural deposition is not considered. Moreover, the first term in equation (1) should be replaced as virus generation rate. Then, the equation can be revised step by step as:

$$V\dot{C} = Iq + [(1 - \eta_{filter})C - C]\dot{V} - (1 - \eta_{filter})C\dot{V}_o - (k_{UV} + k_{purifier})VC \quad (2)$$

$$V\dot{C} = Iq - \eta_{filter}C\dot{V} - (1 - \eta_{filter})C\dot{V}_o - (k_{UV} + k_{purifier})VC \quad (3)$$

$$V\dot{C} = Iq - \eta_{filter}C\dot{V} - (1 - \eta_{filter})C\dot{V}_o - (k_{UV} + k_{purifier})VC \quad (4)$$

$$\dot{C} = \frac{Iq}{V} - \frac{\eta_{filter}}{V}C\dot{V} - \frac{1-\eta_{filter}}{V}C\dot{V}_o - (k_{UV} + k_{purifier})C \quad (5)$$

$$\dot{C} = Iq + C\left(-\frac{\eta_{filter}}{V}\dot{V} - \frac{1-\eta_{filter}}{V}\dot{V}_o - k_{UV} - k_{purifier}\right) \quad (6)$$

$$\dot{C} = \frac{Iq}{V} + C\begin{bmatrix}-\frac{\eta_{filter}}{V}\\ \frac{\eta_{filter}-1}{V}\\ -1\\ -1\end{bmatrix}[T]\begin{bmatrix}\dot{V}\\ \dot{V}_o\\ k_{UV}\\ k_{purifier}\end{bmatrix} \quad (7)$$

$$\dot{x} = \frac{Iq}{V} + xBu \quad (8)$$

where I=number of initial infected people; q=quantum generation rate per person; x=C, $$B = \begin{bmatrix}-\frac{\eta_{filter}}{V}\\ \frac{\eta_{filter}-1}{V}\\ -1\\ -1\end{bmatrix}^T \text{ and } u = \begin{bmatrix}\dot{V}\\ \dot{V}_o\\ k_{UV}\\ k_{purifier}\end{bmatrix}.$$

The modified model is not linear since the state (concentration) is multiplied by system inputs.

To meet the optimization purpose, the model needs to be linearized. For linearization of multivariable function, following equation will be used:

$$f(x) \approx f(p) + \nabla f|_p \cdot (x-p) \quad (9)$$

where X is the vector of variable, and P is the linearization point of interest.

For dynamic IAQ model, starting from initial state and inputs, the equation can be linearized as:

$$\frac{\partial \dot{x}}{\partial x}|_{x_0, u_0} = Bu_0 \quad (10)$$

$$\frac{\partial \dot{x}}{\partial u}|_{x_0, u_0} = x_0 B \quad (11)$$

$$\dot{x}_0 = \frac{Iq}{V} + x_0 B u_0 \quad (12)$$

$$\dot{x}_l = \dot{x}_0 + Bu_0(x - x_0) + x_0 B(u - u_0) \quad (13)$$

Where $x_0$ and $u_0$ are initial state and inputs, I represents linearized. Note that linearized equation has similar form as state-space equation, which is used in space model (5R3C) model. To examine the error of linearization, general expressions of state and inputs, $x=x_0+\Delta x, u=u_0+\Delta u$ are used:

$$\dot{x} = \frac{Iq}{V} + x_0 Bu_0 + x_0 B\Delta u + \Delta x Bu_0 + \Delta x B\Delta u \quad (14)$$

$$\dot{x}_l = \frac{Iq}{V} + x_0 Bu_0 + \Delta x Bu_0 + x_0 B\Delta u \quad (15)$$

It is clear to see that the only difference between original model and linearized model is $\Delta x B \Delta u$. If the difference is not too big, the dynamic IAQ model can be well approximated using linearized equation:

$$\dot{x}_l = \dot{x}_0 + Bu_0(x - x_0) + x_0 B(u - u_0) \qquad (16)$$

which has same form as state-space function.

The model can be further modified by substituting $$\dot{x}_0 = \frac{Iq}{V} + x_0 B u_0$$

into the equation:

$$\dot{x}_l = \frac{Iq}{V} + Bu_0 x + x_0 B u - x_0 B u_0 \qquad (17)$$

$$\dot{x} = A_1 x + B_1 u + E_1 w \qquad (18)$$

where $A_1 = Bu_0$, $x = C$, $B_1 = x_0 B$, $$u = \begin{bmatrix} \dot{V} \\ \dot{V}_0 \\ k_{UV} \\ k_{purifier} \end{bmatrix}, E = \begin{bmatrix} \frac{q}{V} \\ -x_0 B u_0 \end{bmatrix}^T, w = \begin{bmatrix} I \\ 1 \end{bmatrix}.$$

Figure 5:
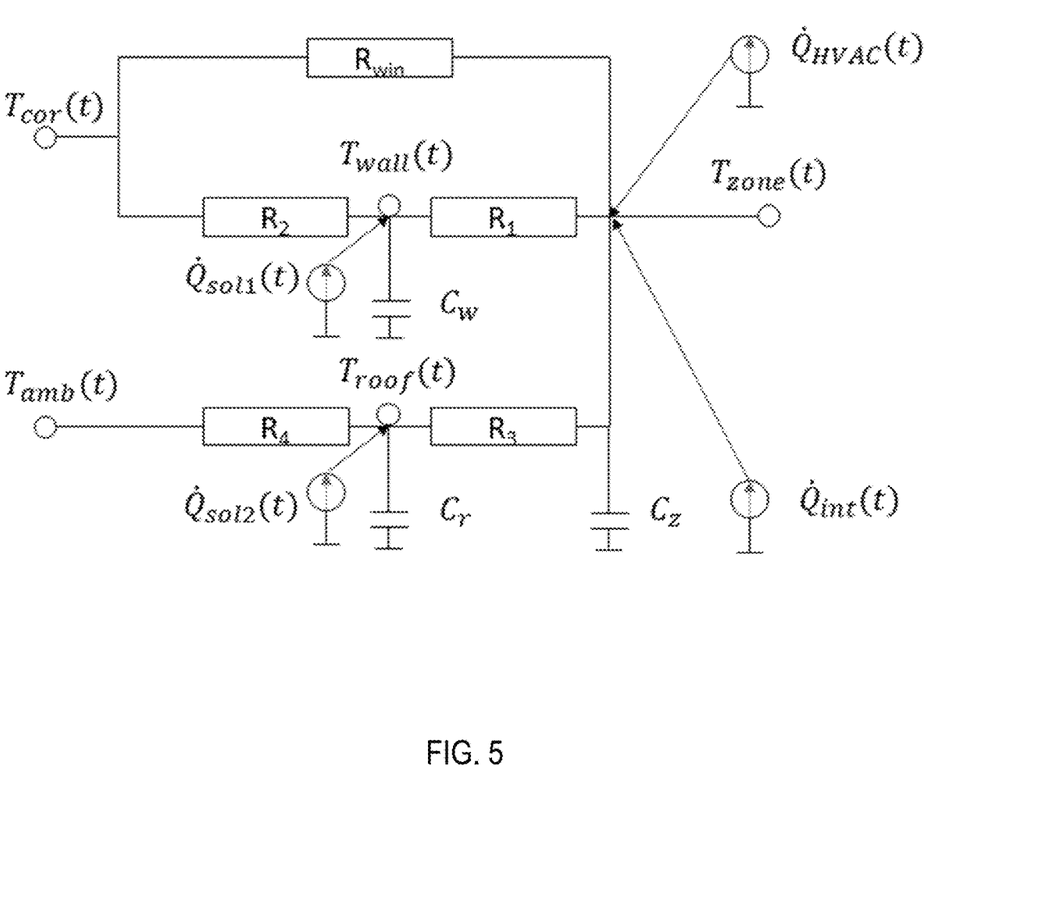
FIG. 5 is a schematic of an 5R3C model according to the present invention.

A 5R3C model may be used as shown in FIG. 5. For the space, the state-space model can be expressed as following equation:

$$\dot{T}_{wall} = \frac{T_{cor} - T_{wall}}{C_w R_2} + \frac{T_{zone} - T_{wall}}{C_w R_1} + \frac{\dot{Q}_{sol1}}{C_w} \qquad (19)$$

$$\dot{T}_{roof} = \frac{T_{amb} - T_{roof}}{C_r R_4} + \frac{T_{zone} - T_{roof}}{C_r R_3} + \frac{\dot{Q}_{sol2}}{C_r} \qquad (20)$$

$$\dot{T}_{zone} = \frac{T_{cor} - T_{zone}}{C_z R_{win}} + \frac{T_{wall} - T_{zone}}{C_z R_1} + \frac{T_{roof} - T_{zone}}{C_z R_3} + \frac{\dot{Q}_{room} + \dot{Q}_{int}}{C_z} \qquad (21)$$

where $\dot{Q}_{room}$ the total cooling or heating load injected into the room by the HVAC system, calculated as:

$$\dot{Q}_{room} = c \rho \dot{V}(T_{supply,room} - T_{set}) \qquad (22)$$

where C=specific heat of supply air, P=supply air density. To start with a simple case, $T_{supply,room}$ and $T_{set}$ are assumed as constants. Then, $\dot{Q}_{room}$ can be treated as a function only related with supply volumetric flow rate $\dot{V}$. The general form of state space model can be expressed as:

$$\dot{x}_l = A_l x_l + B_l u_l + E_l w_l \qquad (23)$$

where $x_l = [T_{wall}\ T_{roof}\ T_{zone}]^T$ is the state of the room; $u_l = \dot{V}$ is control input variable; $w_l = [T_{cor}\ T_{amb}\ \dot{Q}_{sol1}\ \dot{Q}_{sol2}\ \dot{Q}_{int}]^T$ is the uncontrollable input; and the system matrices $A_l$, $B_l$ and $E_l$ are as follows:

$$A_l = \begin{bmatrix} -\frac{R_1 + R_2}{C_w R_1 R_2} & 0 & \frac{1}{C_w R_1} \\ 0 & -\frac{R_3 + R_4}{C_r R_3 R_4} & \frac{1}{C_r R_3} \\ \frac{1}{C_z R_1} & \frac{1}{C_z R_3} & -\frac{R_1 R_3 + R_1 R_{win} + R_3 R_{win}}{C_z R_3 R_{win} R_1} \end{bmatrix}$$

$$B_l = \begin{bmatrix} 0 \\ 0 \\ \frac{\mu c \rho (T_{supply,room} - T_{set})}{C_{zone}} \end{bmatrix}$$

$$E_l = \begin{bmatrix} \frac{1}{C_w R_2} & 0 & \frac{1}{C_w} & 0 & 0 \\ 0 & \frac{1}{C_r R_4} & 0 & \frac{1}{C_r} & 0 \\ \frac{1}{C_z R_{win}} & 0 & 0 & 0 & \frac{1}{C_z} \end{bmatrix}$$

where $R_1, R_2, R_3, R_4, R_{win}, C_w, C_r, C_z$ are the building thermal resistance and capacitance values and $\mu$ is the coefficient of performance of the RTU.

For control and optimization purpose, dynamic IAQ model and 5R3C model can be lumped together as follows:

$$\dot{X} = AX + BU + EW \qquad (24)$$

where:

$X = [T_{wall}\ T_{roof}\ T_{zone}\ C]^T$;

$U = [\dot{V}\ \dot{V}_O\ k_{UV}\ k_{purifier}]^T$;

$W = [T_{cor}\ T_{amb}\ \dot{Q}_{sol1}\ \dot{Q}_{sol2}\ \dot{Q}_{int}\ I\ 1]^T$;

$$A = \begin{bmatrix} -\frac{R_1 + R_2}{C_w R_1 R_2} & 0 & \frac{1}{C_w R_1} & 0 \\ 0 & -\frac{R_3 + R_4}{C_r R_3 R_4} & \frac{1}{C_r R_3} & 0 \\ \frac{1}{C_z R_1} & \frac{1}{C_z R_3} & -\frac{R_1 R_3 + R_1 R_{win} + R_3 R_{win}}{C_z R_3 R_{win} R_1} & 0 \\ 0 & 0 & 0 & \left(-\frac{\eta_{filter}}{V}\dot{V}_0 - \frac{1-\eta_{filter}}{V}\dot{V}_{o0} - k_{UV0} - k_{purifier0}\right) \end{bmatrix};$$

$$B = \begin{bmatrix} 0 & 0 & 0 & 0 \\ 0 & 0 & 0 & 0 \\ \frac{\mu c \rho (T_{supply,room} - T_{set})}{C_{zone}} & 0 & 0 & 0 \\ -\frac{C_0 \eta_{filter}}{V} & C_0 \frac{\eta_{filter} - 1}{V} & -C_0 & -C_0 \end{bmatrix};$$

$$E = \begin{bmatrix} \frac{1}{C_w R_2} & 0 & \frac{1}{C_w} & 0 & 0 & 0 & 0 \\ 0 & \frac{1}{C_r R_4} & 0 & \frac{1}{C_r} & 0 & 0 & 0 \\ \frac{1}{C_z R_{win}} & 0 & 0 & 0 & \frac{1}{C_z} & 0 & 0 \\ 0 & 0 & 0 & 0 & 0 & \frac{q}{V} & -C_0\left(-\frac{\eta_{filter}}{V}\dot{V}_0 - \frac{1-\eta_{filter}}{V}\dot{V}_{o_0} - k_{UV_0} - k_{purifier_0}\right) \end{bmatrix}$$

For a rooftop unit, assuming the unit has different cooling stages, each stage has a constant supply air flow and the compressor cycles on and off to meet the space thermal loads, then energy consumption of coil can be formulated as follows [2]:

$$\dot{p}_{coil} = \frac{\dot{Q}_{ref} f_{EIRT} f_{CCMT}}{COP} \text{ or } \dot{p}_{coil} = \frac{\dot{Q}_{ref} f_{EIRF} f_{CCMF}}{COP} \quad (25)$$

$$\dot{Q}_{room} = \dot{p}_{coil} \cdot COP \quad (26)$$

where:
$\dot{P}_{coil}$=energy consumption of coil;
$\dot{Q}_{ref}$=coil load at rated conditions, which will be different at different cooling stage;
COP=coefficient of performance;
$f_{EIRT}=C_0+C_1 T_o+C_2(T_o)^2+C_3 T_m+C_4(T_m)^2+C_5(T_o)(T_m)$ is energy input ratio modifier curve as a function of temperature;
$f_{EIRF}=C_0+C_1(ff)+C_2(ff)^2+C_3(ff)^3$ is energy input ratio modifier curve as a function of flow fraction. The air flow fraction refers to the ratio of the actual air flow rate across the cooling coil to the rated air flow rate;
$f_{CCMT}=C_0+C_1 T_o+C_2(T_o)^2+C_3 T_m+C_4(T_m)^2+C_5(T_o)(T_m)$ is cooling capacity modifier curve as a function of temperature;
$f_{CCMF}=C_0+C_1(ff)+C_2(ff)^2+C_3(ff)^3$ is cooling capacity modifier curve as a function of flow fraction.

Note that coefficients are different from which in different equation. For curves as functions of temperature, $T_m$ is mixing air temperature, which can be expressed as follows:

$$T_m = \frac{\dot{V}_o}{\dot{V}} T_o + \left(1 - \frac{\dot{V}_o}{\dot{V}}\right) T_z \quad (27)$$

Therefore, coil load is a function of supply flow rate $\dot{V}$ and outdoor flow rate $\dot{V}_o$.

Zone temperature setpoints are set as default set points from ASHRAE Guideline 36 based on the appearance of occupancy. For cooling, setpoint is 24° C. with 1° C. set-back when space is occupied and 32° C. when it is unoccupied.

For indoor air quality requirement, baseline outdoor airflow rate should follow equation from ASHRAE Standard 62.1 for single zone:

$$\dot{V}_o = \frac{R_p \cdot P_z + R_a \cdot A_z}{E_z} \quad (28)$$

where $R_p$=outdoor air flowrate required per person; $P_z$=zone population; outdoor airflow rate required per unit area; $A_z$=zone floor area; $E_z$=zone air distribution effectiveness. For TIEQ lab, it is assembled to simulate office environment, thus from ASHRAE Standard 62.1, $R_p$=5 cmf/person (2.5 L/s·person), $R_a$=0.06 cfm/ft² (0.3 L/s·m²). Since RTU is installed on rooftop, from ASHRAE Standard 62.1, for situation of ceiling supply of cool air, $E_z$=1.

Note that in ASHRAE Standard 62.1, infection risk is not accounted, therefore, outdoor airflow rate calculated from above equation should be only used as baseline, which can be the lower bound of $\dot{V}_o$ when solving optimal problem. The upper bound of outdoor airflow rate $\dot{V}_o$ should no more than supply airflow rate $\dot{V}$. Only when outdoor damper is fully open, $\dot{V}_o=\dot{V}$.

Figure 6:
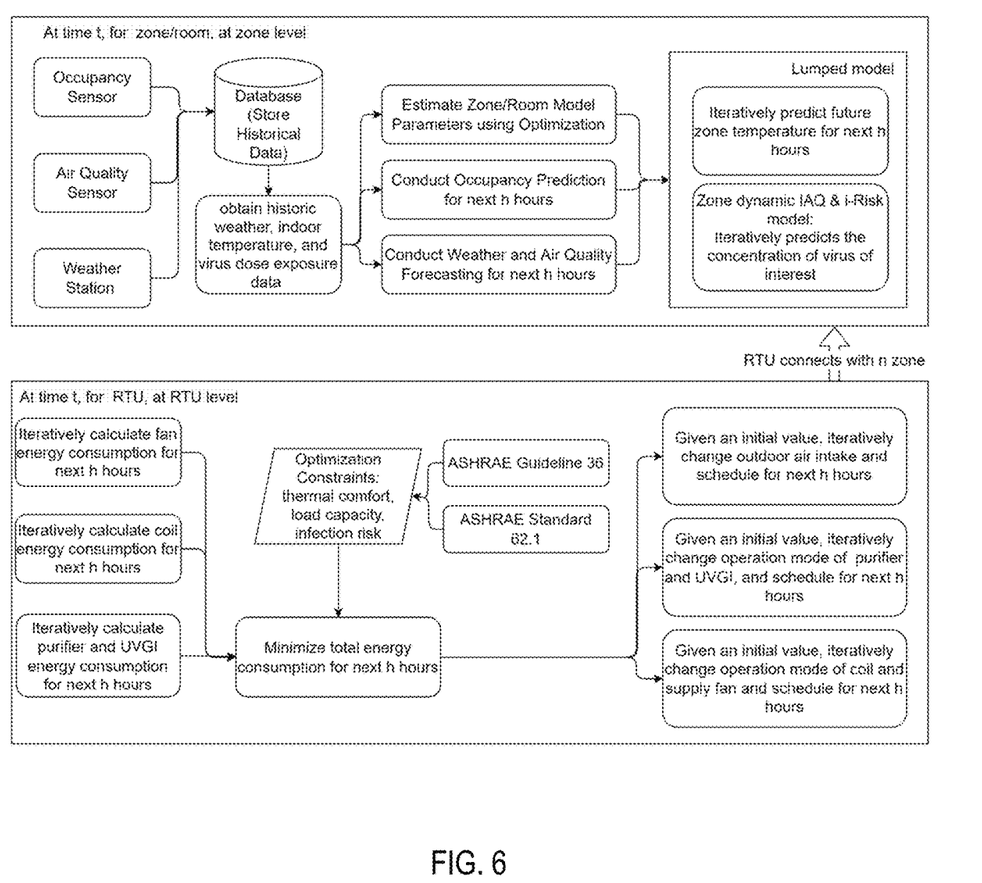
FIG. 6 is a diagram of a model predictive control system according to the present invention.

Referring to FIG. 6, the overall model predictive control design architecture includes a joint optimization objective can be designed to minimize the sum of RTU fan energy, air side heating/cooling energy in an RTU, UVGI energy and purifier energy for a prediction horizon h:

$$J^t = p_{fan}{}^t + p_{RTU}{}^t + p_{UVGI}{}^t + p_{purifier}{}^t \quad (29)$$

where fan energy $$p_{fan} = f(\dot{V}) = p_{ref}\left(\frac{\dot{V}}{\dot{V}_{ref}}\right)^3,$$

or other equation from regression of measured data;

$$\dot{p}_{coil} = \frac{\dot{Q}_{ref} f_{EIRT} f_{EIRF} f_{CCMT} f_{CCMF}}{COP}$$

is coil energy; $p_{UVGI}=f(k_{UV})$ is UVGI energy, which is different at different stage and can be found from product manual; $p_{purifier}=f(k_{purifier})$ is purifier energy, which is different at different stage and can be found from product manual.

Thus, a centralized MPC controller will solve the following multi-objective problem for all room at a RTU level, over some prediction horizon h:

$$\text{minimize } \sum_{t=1}^{h} J^t(U) \quad (30)$$

$$\text{subject to } \dot{X} = AX + BU + EW \quad (31)$$

$$X_l^{min} \leq X_l^t \leq X_l^{max} \; \forall \, l = 1, \ldots, n, \forall \, t = 1, \ldots, h \quad (32)$$

$$U_l^{min} \leq U_l^t \leq U_l^{max}, \; \forall \, l = 1, \ldots, n, \forall \, t = 1, \ldots, h \quad (33)$$

$$p_{risk}^t = 1 - e^{-\int_{t_1}^{t_2}(cp)dt} \leq p_{risk}^{required}, \; \forall \, t = 1, \ldots, h \quad (34)$$

where $U=[\dot{V}\ \dot{V}_O\ k_{UV}\ k_{purifier}]^T$ are control variables for a single room K. For different RTU, UVGI and purifier, U could be single stage, two stages or continuous values.

In the reinforced learning approach, a pre-trained RL agent can be obtained by simulating an existing physics-based model. The training may be implemented based on measured historical data of the HVAC system. The simplified physics model, the 5R3C Model as seen in FIG. 5, can represent the state space of a room or a building.

In the simplified physics model, the state space $S_t$ at time step t is the observation from the environment which includes, room temperature, outdoor temperature, room temperature setpoint, infection risk, outdoor air flow rate, supply air flow rate, and time of the day. The simulation process provides those data as observations the environment sends to the agent. The optimal control policy $\pi_\theta$ is determined by the observations of the environment state at time step t. The state space at time step t can be denoted as following Equation 36

$$S_t = [T_{room}, T_{oa}, T_{sep}, P, \dot{V}_o, \dot{V}, ToD] \tag{36}$$

where $T_{room}$ is the room temperature at time step t, $T_{oa}$ is the outdoor temperature at time step t, $\dot{V}_o$ is the outdoor air flow rate, $\dot{V}$ is the supply air flow rate, P is the infection risk in the room at time step t, and ToD is the time of the day.

In the model-free approach, the agent first selects action a based on its pre-defined policy (from previous schedules) and sends the action to the building environment. Then the building provides its updated observations based on the received action, and sends back the reward of the action to the agent. Different from the previous approach (1), those observations are measured through sensor network within the building and the HVAC system. The agent can learn and improve its control policy by evaluating the rewards and observations. Detailed of observations, actions, rewards, and agent model are described in the following content. The observations in field experiment study are from sensor measurements. Since building model is not needed in this approach, so this is a purely data driven RL approach.

In the data-driven approach, the state space $S_t$ at time step t is the observation $O_t$ from the environment which includes, room temperature, outdoor temperature, room temperature setpoint, infection risk, outdoor air flow rate, supply air flow rate, and time of the day. Different from the simulation study, the sensor will send measured data to the agent as environment observations. The optimal control policy $\pi_\theta$ is determined by the observations of the system state at time step t. The state space at time step t can be denoted as following Equation 37

$$S_t = [T_{room}, T_{oa}, T_{sep}, P, \dot{V}_o, \dot{V}, ToD] \tag{37}$$

where $T_{room}$ is the room temperature at time step t, $T_{oa}$ is the outdoor temperature at time step t, $\dot{V}_o$ is the outdoor air flow rate, $\dot{V}$ is the supply air flow rate, P is the infection risk in the room at time step t, and ToD is the time of the day. The sensor network within the building and HVAC system will provide measured values of the aforementioned parameters.

For the action space of the RL agent, it includes change the work stage of the RTU, each stage has a constant supply airflow rate associate with it, change the outdoor airflow rate, turn on/off UV filter, and turn on/off the indoor air purifier. The action at time step t is determined by the policy $\pi_\theta$, following $\pi_\theta$ the agent chooses action from a categorical distribution through the neural networks. The optimal policy can be learned by the agent through interacting with the environment. The action space can be denoted as following Equation 38

$$\begin{aligned} a_t \in A\ \ a_t &= [a_{s_t}, a_{o_t}, a_{UV_t}, a_{purifier_t}] \\ a_{s_t} &\sim \{0,1,2\}; a_{o_t} \sim R_+; a_{UV_t}, a_{purifier_t} \sim \{0,1\} \end{aligned} \tag{38}$$

where $a_{s_t}$ is the cooling stage of the RTU with a discrete value among $\{0,1,2\}$ at time step t, different stages associate with different supply airflow rates. Stage 0 means the RTU is off, stage 1 means one compressor is on duty, and stage 2 means two compressors are on duty. $a_{o_t}$ is the outdoor airflow rate at time step t with a continuous value which can be adjusted based on the space occupancy, $a_{UV_t}$ is the on/off status of the UVGI at time step t, $a_{purifier_t}$ is the on/off status of the indoor air purifier at time step t. Both $a_{UV_t}$ and $a_{purifier_t}$ are discrete values between 0 (off) and 1 (on).

The reward function should be designed to meet the objectives of the present invention, including maintaining occupant comfort, minimizing infection risk, and reducing HVAC energy consumption. The reward function can be denoted as in Equation 39 below. To get better and more steady training process, the rewards $(R_t^T, R_t^I, R_t^E)$ are normalized to [0, 1].

Negative reward $R_t$ is adopted here to get better convergence of the agent model, and the goal of the agent is maximizing total reward by learning optimal policy of the control actions. Better policy $\pi_\theta$ leads to larger total rewards R.

$$\begin{aligned} R_t &= -(p_1 * \text{Norm}(T_t^T) + p_2 * \text{Norm}(R_t^I) + p_3 * \text{Norm}(R_t^E)) \\ R_t^T &= \max(T_t^{zone} - \overline{T_t}, 0) + \max(\underline{T_t} - T_t^{zone}, 0) \\ R_t^I &= P_t^I\ \ R_t^E = P_t^{RTU} + P_t^{UVGI} + P_t^{purifier} \\ P_t^{RTU} &= P_t^{coil} + P_t^{fan} \end{aligned} \tag{39}$$

where $R_t^T, R_t^I, R_t^E$ denote the rewards of occupant comfort, infection risk, and energy consumption at time step t. $p_1, p_2, p_3$ are tunable constant factors which balance the multiple objectives. $T_t^{zone}$ is the zone temperature at time step t, $\overline{T_t}$ and $\underline{T_t}$ the upper bound and lower bound of the room temperature setpoints. $P_t^I$ the infection risk of the occupant within the space, it can be calculated by the Dynamic IAQ Model. $P_t^E$ is the total energy consumption which includes energy consumption of the RTU ($P_t^{RTU}$), UVGI filter ($P_t^{UVGI}$) and the indoor air purifier ($P_t^{purifier}$). The energy consumption of RTU ($P_t^{RTU}$) includes coil load ($P_t^{coil}$) and fan power ($P_t^{fan}$).

The agent model of the present invention adopts the TD Actor-Critic model for the RL agent. The actor-critic method is a combination of actor-only and critic-only reinforcement learning approaches. The critic first learns a value function by an approximation architecture and simulation. Then it was used to update the actor's policy paraments to improve the performance of the actor. Three layers of neural networks are used to build the Actor-Critic model. TD error $\delta_t^{\pi_\theta}$ is used to evaluate how good the current policy is, it was calculated as Equation 40

$$\delta_t^{\pi_\theta} = r_{t+1} + \gamma V^{\pi_\theta}(S_{t+1}) - V^{\pi_\theta}(S_t) \tag{40}$$

where $V^{\pi_\theta}(S_t)$ is the critic state value under policy $\pi_\theta$ at time step t and $V^{\pi_\theta}(S_{t+1})$ is the critic state value under policy $\pi_\theta$ at time step t+1. $\gamma$ is the discount factor. $r_{t+1}$ is the reward of action taken at time step t. The critic state value can be obtained through function approximation using neural networks.

The TD error $V^{\pi_\theta}(S_{t+1})$ is used to calculate the loss function. The loss functions of the actor-critic model can be formed as Equation 41 following the policy gradient theorem. $\nabla_\theta J$ shows loss function of the actor network, and $\nabla_\theta U$ is loss function of the critic network.

$$\nabla_\theta J = \mathbb{E}_{\pi_\theta}[\nabla_\theta \log \pi_\theta(a|S) \delta^{\pi_\theta}] \quad (41)$$

$$\nabla_\theta U = \mathbb{E}_{\pi_\theta}[(\delta^{\pi_\theta})^2]$$

The control action $a_t = [a_{s_t}, a_{o_t}, a_{UV_t}, a_{purifier_t}]$ includes multiple individual actions, this requires multiple actor-critic agents in this study. Each agent can generate a control action a and learn an optimal policy for action a through policy gradient approach as Equation 41 showing above. Algorithm 1 shows details of how the RL agent model works.

Algorithm 1. TD Actor-Critic Reinforcement Learning in gym environment

Actor-Critic (S, $\pi_\theta$)
  Initialize $\pi_\theta$ to random policy
  Reset gym environment to initial values
  Loop over number of episodes
    Set n = 0
    Loop while S is not terminal
      Choose action from $a_t \sim \pi_\theta(a|S_t)$
      Send action to the environment, and observe $r_{t+1}, S_{n+1}$
      Calculate TD error (Equation 40)

Update critic network state value $V^{\pi_\theta}(S_{t+1})$ (Function approximation using neural networks)

Update policy $\pi_\theta$ (Equation 41)
      n = n + 1
  Save policy $\pi_\theta$ Referring to FIG. 6, a method of implementing the present invention comprises obtaining historic weather, indoor temperature, and virus dose exposure data, such as from a database including such information as collected historically from occupancy sensors, air quality sensors, and weather stations. Next, zone/room model parameters are estimated using the optimization described above. Occupancy prediction is then conducted for the next h hours as selected. The lumped model then iteratively predicts future zone temperatures for the next h hours, and the zone dynamic IAQ and i-Risk model iterative predicts the concentration of virus of interest. As the RTU level, fan energy consumption is iteratively calculated for next h hours, coil energy consumption is iteratively calculated for the next h hours, and purifier and UVGI energy consumption interactively calculated for next h hours. Total energy consumption is then minimized for the next h hours using optimization constraints, thermal comfort, load capacity and infection risk (which may be based on ASHREA guidelines and standards). Based on the minimized total energy consumption, outdoor air intake is iteratively changed and scheduled from an initial value over the next h hours, purifier and UGVI states are iteratively changed and scheduled from an initial value over the next h hours, and the coil and supply fan states are iteratively changed and scheduled from an initial value over the next h hours.

What is claimed is:

1. A system for controlling a heating, ventilation, and air conditioning (HVAC) system, comprising:
at least one sensor unit configured to determine a current room temperature, a current occupancy, and a current indoor air quality of a room in which said sensor unit is positioned;
a control hub interconnected to said sensor unit to receive said current room temperature, said current occupancy, and said current indoor air quality of the room in which said at least one sensor unit is positioned, wherein said control hub includes a local communication interface for operation of an HVAC unit having an operational state and a selectable amount of fresh air by selecting said operational state and by selecting said selectable amount of fresh air intake, and a remote communication interface that allows said control hub to transmit said current room temperature, said current occupancy, and said current indoor air quality of the room in which said at least one sensor unit is positioned and to receive at least one command indicating how said control hub should control operation of said HVAC unit; and
a remote host configured to communicate with said control hub and to receive said current room temperature, said current occupancy, and said current indoor air quality from said control hub, wherein the remote host is programmed to issue said at least one command to said control hub to implement a control strategy for a future time period developed by an optimization engine that determines how to operate said HVAC unit, wherein the optimization engine uses a multi-objective model predictive control architecture to develop the control strategy for the future time period based on a forecasting of future occupancy, a forecasting of future weather, a future ambient air quality, a future room temperature, a future indoor air quality, a future energy load, and a dose exposure of a virus of interest as well as said current room temperature, said current occupancy, and said current indoor air quality to minimize a total energy consumption of said HVAC unit while minimizing an overall infection risk for the virus of interest.

2. The system of claim 1, wherein the optimization engine includes a plurality of data driven models for unknown states and parameters.

3. The system of claim 2, wherein the optimization engine includes a mixed integer programming formulation that solves both continuous and discrete equipment.

4. The system of claim 3, wherein the optimization engine includes stochastic programming for uncertainty management.

5. The system of claim 4, wherein the optimization engine employs reinforcement learning.

6. The system of claim 5, wherein the HVAC unit comprises a rooftop mounted HVAC unit.

7. A method of controlling a heating, ventilation, and air conditioning (HVAC) system, comprising:
providing at least one sensor unit configured to determine a current room temperature, a current occupancy, and a current indoor air quality of a room in which said sensor unit is positioned;
connecting a control hub to said sensor unit to receive said current room temperature, said current occupancy, and said current indoor air quality of the room in which said at least one sensor unit is positioned;

connecting said control hub to an HVAC unit having an operational state and a selectable amount of fresh air intake;

connecting said control hub to a remote host programmed to send at least one command to said control hub according to a control strategy for a future time period developed by an optimization engine that determines how to operate the HVAC unit, wherein the optimization engine uses a multi-objective model predictive control architecture to develop the control strategy for the future time period based on a forecasting of future occupancy, a forecasting of future weather, a future ambient air quality, a future room temperature, a future indoor air quality, a future energy load, and a dose exposure of a virus of interest as well as said current room temperature, said current occupancy, and said current indoor air quality received from said control hub to minimize a total energy consumption of the HVAC unit while minimizing an overall infection risk; and using said control hub to operate the HVAC unit according to said at least one command sent to the control hub by the remote host by selecting said operational state and by selecting said selectable amount of fresh air intake.

8. The method of claim 7, wherein the optimization engine includes a plurality of data driven models for unknown states and parameters.

9. The method of claim 8, wherein the optimization engine includes a mixed integer programming formulation that solves both continuous and discrete equipment.

10. The method of claim 9, wherein the optimization engine includes stochastic programming for uncertainty management.

11. The method of claim 10, wherein the optimization engine employs reinforcement learning.

12. The method of claim 11, wherein the HVAC unit comprises a rooftop mounted HVAC unit.

* * * * *